United States Patent [19]

Hradek

[11] Patent Number: 4,870,960
[45] Date of Patent: Oct. 3, 1989

[54] BACKUP BREATHING GAS SUPPLY FOR AN OXYGEN CONCENTRATOR SYSTEM

[75] Inventor: Richard W. Hradek, Davenport, Iowa

[73] Assignee: Litton Systems, Inc., Davenport, Iowa

[21] Appl. No.: 62,131

[22] Filed: Jun. 12, 1987

Related U.S. Application Data

[63] Continuation of Ser. No. 785,236, Oct. 7, 1985, abandoned.

[51] Int. Cl.$^4$ .............................................. A61M 16/00
[52] U.S. Cl. ........................... 128/202.22; 128/204.18
[58] Field of Search ...................... 128/202.26, 204.18, 128/205.12, 205.14, 202.22; 55/21, 25

[56] References Cited

U.S. PATENT DOCUMENTS

| | | | |
|---|---|---|---|
| 4,263,018 | 4/1981 | McCombs et al. | 55/25 |
| 4,349,357 | 9/1982 | Russell | 55/21 |
| 4,428,372 | 1/1984 | Beyser et al. | 128/202.26 |
| 4,491,459 | 1/1985 | Pinkerton | 55/21 |

FOREIGN PATENT DOCUMENTS 2058580  4/1981  United Kingdom ........... 128/205.24

Primary Examiner—Max Hindenburg
Assistant Examiner—J. P. Lackyk
Attorney, Agent, or Firm—Brian L. Ribando

[57] ABSTRACT

A backup breathing gas supply is used with an oxygen concentrator system in which breathing gas is derived as an oxygen enriched product gas from the oxygen concentrator system and delivered to a breathing regulator. The backup breathing gas supply includes a plenum chamber for storing a quantity of breathing gas, a plenum line coupling the output of the oxygen concentrator to the plenum chamber, and a bypass line coupled to the output of the oxygen concentrator. During normal operation, breathing gas is delivered by means of the bypass line. In the event of loss of air supply to the concentrator, loss of electrical power, or concentrator breakdown, breathing gas is delivered from the plenum chamber. A three-way control valve is used to selectively couple either the plenum chamber or the bypass line to the system outlet. A quantity of molecular sieve material is contained in the plenum chamber to increase the capacity of the chamber to contain breathing gas beyond its capacity without molecular sieve material.

2 Claims, 1 Drawing Sheet

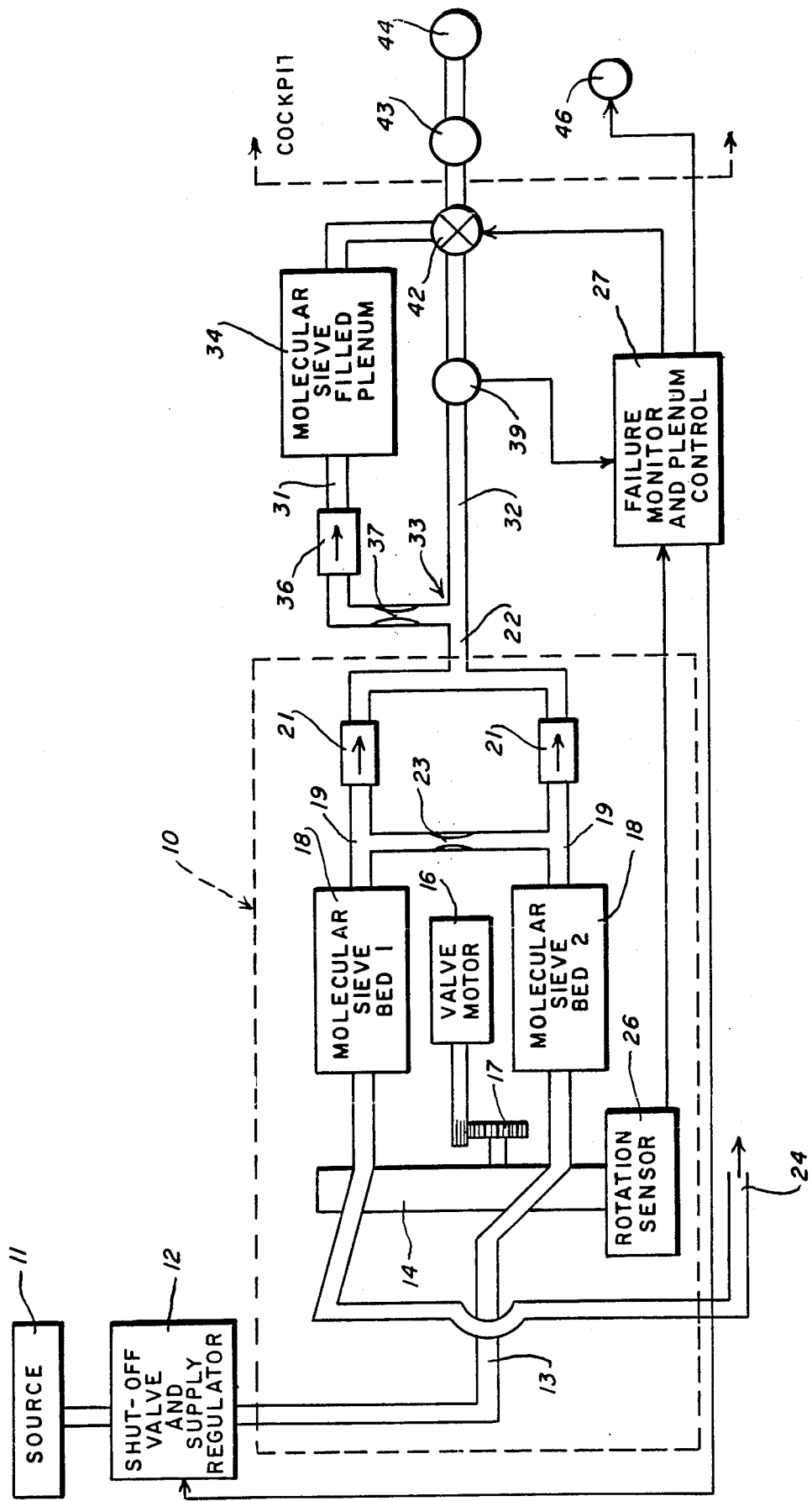

BACKUP BREATHING GAS SUPPLY FOR AN OXYGEN CONCENTRATOR SYSTEM

This is a continuation of co-pending application Ser. No. 785,236 filed on Oct. 7, 1985 now abandoned.

BACKGROUND OF THE INVENTION

The invention relates to a backup breathing gas supply for high altitude flying where the main breathing supply is provided by a pressure swing adsorption system.

The use of pressure swing adsorption systems or concentrators to derive an oxygen enriched product gas through the pressure swing adsorption technique is well known. This technique involves the use of two or more molecular sieve beds which trap certain components of air while letting selected other components pass through the system as enriched product gas. The output of such systems may be oxygen which is used as a breathing gas supply for a pilot engaged in high altitude flying.

The pressure swing adsorption system itself is designed to eliminate the need for providing a bottled oxygen breathing gas supply on an aircraft. However, it is desirable to have a backup breathing gas supply in the event of a failure in the concentrator system. The backup supply is used during brief periods of interruption of concentrator output caused by one or more of the following conditions: (1) loss of bleed air due to aircraft engine flame out; (2) loss of electrical power and resulting concentrator pressure cycling due to an open circuit breaker; or (3) failure of concentrator cycling due to a stopped rotary valve.

Although a concentrator derived breathing gas supply is intended to replace bottled gas and/or stored liquid oxygen for normal operation, bottled gas is often used as the backup breathing gas supply for aircraft. This is undesirable since it requires the storage and handling of the bottled oxygen which is costly, hazardous, and unavailable in remote areas.

SUMMARY AND OBJECTS OF THE INVENTION

A molecular sieve filled plenum is used as the storage container for the backup breathing supply for an aircraft concentrator system and is coupled to the concentrator outlet. The plenum is filled directly by the concentrator during normal concentrator operation and eliminates the need for a separate high pressure bottled oxygen supply on the aircraft. The use of molecular sieve inside the plenum provides storage of additional oxygen enriched supply for a given size plenum at a given temperature and pressure.

It is therefore an object of the invention to provide a backup breathing gas supply which eliminates the need for bottled oxygen.

It is another object of the invention to provide a backup breathing gas supply for a concentrator system which utilizes a plenum coupled to the concentrator outlet which is filled during concentrator operation.

These and other objects of the invention will become apparent from the following detailed description taken in conjunction with the accompanying drawing figures wherein reference numerals used throughout the description designate like or corresponding parts shown on the drawings.

BRIEF DESCRIPTION OF THE DRAWING

The sole drawing figure shows a pressure swing adsorption system with a storage plenum coupled to the system outlet.

DESCRIPTION OF THE PREFERRED EMBODIMENT

Referring now to the drawing figure, there is shown a pressure swing adsorption system or concentrator which is generally designated by the reference numeral 10. A source 11 of high pressure air such as the bleed air from a jet aircraft engine or the like is coupled through a shut-off valve and supply regulator 12 to the inlet 13 of the concentrator 10. The supply regulator 12 controls and reduces the pressure of the bleed air and couples the same to the rotary control valve 14 of the oxygen concentrator system. The rotary valve 14 is driven by a valve motor 16 through a gear train 17. The control valve 14 alternates the flow of air to two beds 18 of molecular sieve material where the desired product gas, in this case oxygen, is separated from the remaining constituents of the source gas. The outlets 19 of the two beds are coupled through one way valves 21 to a concentrator outlet 22. A portion of the enriched product gas flows through a restrictor 23 and is used to alternately purge the two beds 18 when the beds are not at that time generating product gas. The rotary valve 14 couples the particular bed which is being purged to a purge exhaust port 24. A rotation sensor 26 is coupled to the rotary valve 14 and senses whether or not the valve 14 is rotating. The output of the rotation sensor 26 is coupled to a failure monitor and plenum control 27.

The concentrator outlet 22 is coupled to a plenum line 31 and a bypass line 32 by a Y junction 33. A plenum chamber 34 is coupled to the plenum line 31 and is filled with molecular sieve material. The use of molecular sieve material within the plenum allows the plenum chamber 34 to store a greater quantity product gas at a given temperature and pressure than the same sized chamber without the sieve material within. The plenum line 31 includes a one way valve 36 and a flow restrictor 37 upstream of the plenum chamber 34, and the bypass line 32 includes a low pressure switch 39. The output of the low pressure switch is coupled to the failure monitor and plenum control 27. The plenum line 31 and the bypass line 32 are both coupled to a three-way solenoid valve 42.

The output of the three-way valve 42 is coupled to a breathing regulator 43 which controls gas flow to a pilot breathing apparatus 44 such as a face mask. A warning lamp 46 is located in the cockpit and is activated by a signal from the failure monitor and plenum control 27.

MODE OF OPERATION OF THE PREFERRED EMBODIMENT

During normal operation, compressed air from the source 11 is regulated by the shut-off valve and supply regulator 12 and delivered to the rotary valve 14. The rotary valve 14 couples the source air to one of the molecular sieve beds 18, and the resultant product gas flows through the one-way valve 21 to the concentrator outlet 22. At the same time, a portion of the enriched product gas flows through the restrictor 23 and backflows through the other molecular sieve bed 18 to flush trapped impurities from the bed to the purge exhaust 24. This basic operation of the concentrator is periodically reversed and repeated under the control of the rotary valve 14.

Product gas from the concentrator outlet 22 is supplied to both the plenum line 31 and the bypass line 32 by the Y connector 22. During normal operation of the concentrator, the three-way valve 42 is closed to the plenum line 31 but open to the bypass line, thus coupling product gas from the bypass line 32 to the breathing regulator 43 and to the breathing apparatus 44.

The storage capacity of the plenum 34 for product gas is increased with the plenum filled with molecular sieve material. As an example, the amount of gas which can be stored at 50 psig is increased by three times with molecular sieve material inside the plenum, and larger increases are possible at lower pressures. The parallel arrangement of the plenum line 31 and the bypass line 32 provides product gas flow into the plenum whenever the concentrator is in operation and the pressure at the outlet 22 is greater than pressure in the plenum 34. The check valve 36 upstream of the plenum automatically provides flow into the plenum whenever the pressure at the concentrator outlet 22 exceeds the plenum pressure, and prevents loss of stored gas from the plenum inlet when the concentrator outlet pressure drops below the plenum pressure such as when flying at high altitudes or when the system is shut off on the ground.

The restrictor 37 which is upstream of the plenum 34 limits the breathing gas flow from the concentrator 10 and the fill rate of the plenum 34. This is desirable in order to limit flow into the plenum 34 and avoid large output flows from the concentrator and subsequent low oxygen content for the gas going into the plenum such as occurs when the pressure at the concentrator outlet 22 is much greater than the plenum pressure.

According to the invention, the backup breathing gas supply in the plenum 34 is automatically coupled to the breathing regulator 43 in case of the following: (1) loss of bleed air pressure; (2) loss of electrical power to the concentrator; or (3) loss of rotation of the rotary valve 14. The three-way solenoid valve 42, rotation sensor 26, the failure monitor and plenum control 27, and the low pressure switch 39 provide the automatic control for both filling and using the plenum chamber 34. During normal concentrator operation, breathing gas is supplied to the breathing regulator 43 through the bypass line 32, and the three-way valve 42 is closed to the plenum line 31. At the same time, however, the Y connection 33 and the one-way valve 36 allow the plenum chamber 34 to fill with breathing gas from the concentrator outlet 22.

Failure of the rotary valve to rotate will be sensed by the rotation sensor 26. This condition indicates a failure of either the valve motor 16 or the gear train 17, an interruption in electrical power to the valve motor 16, or a jammed rotary valve 14. In response to this type of failure, the failure monitor and plenum control 27 (1) switches the three-way valve 42 to establish flow between the plenum 34 and the breathing regulator 43, (2) closes the shut-off valve and supply regulator 12, and (3) activates the cockpit warning lamp 46. The sensing of a low pressure by the switch 39 in the bypass line 32 indicates a loss of bleed air pressure. This condition causes the failure monitor and plenum control 27 to (1) switch the three-way valve 42 to establish flow between the plenum 34 and the breathing regulator 43, and (2) activate the cockpit warning lamp 46. Thus, the plenum 34 delivers breathing gas to the regulator 43 whenever a failure condition is sensed by the rotation monitor 26 or the low pressure switch 39.

Having thus described the invention, various alterations and modifications thereof will occur to those skilled in the art, which alterations and modifications are intended to be within the scope of the invention as defined by the appended claims.

What is claimed is:

1. A backup breathing gas supply for use with an oxygen concentrator in which a source gas is coupled by a rotary valve to a plurality of beds of molecular sieve material in the concentrator to produce an enriched product gas at the concentrator outlet for delivery as a breathing gas to a breathing regulator, wherein the rotary valve periodically alternates the flow of the source gas to the plurality of beds of molecular sieve material in order to produce breathing gas, the backup breathing gas supply comprising:

a plenum chamber for storing a quantity of breathing gas, a quantity of molecular sieve material contained in the plenum chamber, whereby the capacity of plenum chamber to contain breathing gas is increased by the addition of molecular sieve material, a plenum line coupling the outlet of the oxygen concentrator to the plenum chamber, a bypass line coupled to the outlet of the oxygen concentrator in parallel with the plenum line, control means for selectively coupling either the plenum chamber or the bypass line to the breathing regulator, said control means comprising a three-way valve coupled to the outlet of the plenum chamber and the bypass line, a check valve in the plenum line upstream of the plenum chamber whereby breathing gas fills said plenum chamber whenever the concentrator outlet pressure exceeds the plenum pressure, and whereby loss of stored gas from the plenum input through the bypass line to the breathing regulator when the concentrator outlet pressure is less than the plenum pressure is prevented, a rotation sensor means for detecting the failure of the rotary valve, said sensor means causing said control means to deliver breathing gas from the plenum chamber to the breathing regulator upon said failure, and restrictor means in the plenum line upstream of the plenum chamber for limiting the fill rate of the plenum chamber during periods when the concentrator output pressure exceeds the plenum pressure.

2. The backup breathing gas supply of claim 1 further comprising:

sensor means for detecting a loss of pressure in the bypass line, said sensor means causing said control means to deliver breathing gas from the plenum chamber to the breathing regulator.

* * * * *